United States Patent
Friedman et al.

(10) Patent No.: US 12,417,460 B2
(45) Date of Patent: Sep. 16, 2025

(54) SYSTEMS AND METHODS TO ENABLE PAYMENTS IN THE ABSENCE OF A POINT OF SALE DEVICE

(71) Applicant: MASTERCARD INTERNATIONAL INCORPORATED, Purchase, NY (US)

(72) Inventors: Michael J. Friedman, Stamford, CT (US); Mouna Fouillade, Boulogne-Billancourt (FR)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 377 days.

(21) Appl. No.: 17/317,601

(22) Filed: May 11, 2021

(65) Prior Publication Data

US 2021/0264422 A1 Aug. 26, 2021

Related U.S. Application Data

(63) Continuation of application No. 14/043,339, filed on Oct. 1, 2013, now abandoned.
(Continued)

(51) Int. Cl.
*G06Q 20/40* (2012.01)
*G06Q 20/12* (2012.01)
(Continued)

(52) U.S. Cl.
CPC ......... *G06Q 20/4015* (2020.05); *G06Q 20/12* (2013.01); *G06Q 20/20* (2013.01); *G06Q 20/322* (2013.01); *G06Q 20/385* (2013.01)

(58) Field of Classification Search
CPC ............ G06Q 20/322; G06Q 20/3223; G06Q 20/325–3255; G06Q 20/385
See application file for complete search history.

(56) References Cited

U.S. PATENT DOCUMENTS 7,958,052 B2 * 6/2011 Powell ................. G06Q 40/02
705/64
8,751,316 B1 6/2014 Fletchall et al.
(Continued)

FOREIGN PATENT DOCUMENTS

GB 2447709 A 9/2008

*Primary Examiner* — Eric T Wong
(74) *Attorney, Agent, or Firm* — Armstrong Teasdale LLP (57) ABSTRACT

A method and system for processing a transaction between a merchant and a consumer using a consumer mobile device wherein the consumer mobile device is in communication with a payment processing computing device having a memory are provided. The method includes receiving merchant data associated with the merchant, receiving a consumer alias associated with the consumer, receiving, a transaction request message from the consumer mobile device, the transaction request message including a merchant identifier, a transaction amount, a device identifier associated with the consumer mobile device, and consumer verification data, retrieving the account number based on the device identifier and the consumer verification data, retrieving the merchant data based on the merchant identifier, generating an authorization request message including the account number, the transaction amount, and the merchant data, and transmitting the authorization request message over a payment network to an issuer bank.

20 Claims, 7 Drawing Sheets

Related U.S. Application Data (60) Provisional application No. 61/859,401, filed on Jul. 29, 2013.

(51) Int. Cl.
*G06Q 20/20* (2012.01)
*G06Q 20/32* (2012.01)
*G06Q 20/38* (2012.01)

(56) References Cited

U.S. PATENT DOCUMENTS

| | | | |
|---|---|---|---|
| 10,586,250 B1* | 3/2020 | Spils | G06Q 30/0259 |
| 2004/0098350 A1* | 5/2004 | Labrou | G06Q 20/12 |
| | | | 705/64 |
| 2008/0091528 A1* | 4/2008 | Rampell | G06Q 30/0633 |
| | | | 705/14.1 |
| 2009/0240626 A1 | 9/2009 | Hasson et al. | |
| 2010/0049651 A1 | 2/2010 | Lang et al. | |
| 2010/0049654 A1 | 2/2010 | Pilo | |
| 2011/0178883 A1* | 7/2011 | Granbery | G06Q 20/40 |
| | | | 705/16 |
| 2011/0218880 A1* | 9/2011 | Hammad | G06Q 20/40 |
| | | | 705/26.41 |
| 2011/0251910 A1 | 10/2011 | Dimmick | |
| 2012/0209749 A1 | 8/2012 | Hammad et al. | |
| 2012/0290415 A1 | 11/2012 | Itwaru | |
| 2013/0054320 A1 | 2/2013 | Dorso et al. | |
| 2013/0073365 A1 | 3/2013 | Mccarthy | |
| 2013/0097078 A1* | 4/2013 | Wong | G06Q 20/10 |
| | | | 705/44 |
| 2013/0117184 A1* | 5/2013 | Ciurea | G06Q 20/20 |
| | | | 705/44 |
| 2013/0160098 A1* | 6/2013 | Carlson | G06F 21/31 |
| | | | 726/6 |
| 2013/0212017 A1* | 8/2013 | Bangia | G06Q 20/3276 |
| | | | 705/44 |
| 2013/0246203 A1 | 9/2013 | Laracey | |
| 2014/0236767 A1 | 8/2014 | Duggal et al. | |
| 2014/0279537 A1* | 9/2014 | Cicoretti | G06Q 20/40 |
| | | | 705/44 |
| 2015/0287021 A1* | 10/2015 | Itwaru | G06Q 20/40 |
| | | | 705/44 |
| 2019/0005494 A1* | 1/2019 | Hammad | G06Q 20/401 |

\* cited by examiner

SYSTEMS AND METHODS TO ENABLE PAYMENTS IN THE ABSENCE OF A POINT OF SALE DEVICE

CROSS REFERENCE TO RELATED APPLICATIONS

This application is a continuation of and claims priority to U.S. application Ser. No. 14/043,339 filed on Oct. 1, 2013, which claims priority to and the benefit of the filing date of U.S. Provisional Application No. 61/859,401 filed on Jul. 29, 2013, both of which are hereby incorporated by reference in their entirety.

BACKGROUND

This disclosure relates generally to consumer initiated financial transaction payment requests and, more particularly, to computer systems and computer-based methods for capturing data by a mobile device and processing the data for completing a purchase without a point of sale device.

At least some known merchants engaged in commerce do not use or otherwise have access to traditional point-of-sale (POS) devices. However, customers of these merchants may be inclined to use non-cash options when making purchases. For example, merchants may gather at impromptu locations such as, but, not limited to farmers' markets, flea markets, rummage sales, stalls, and kiosks, but may not have access to electricity, Internet, or to other networks, and resources.

Accordingly, it would be desirable to provide a system and/or method for a consumer-initiated financial transaction without a POS device.

BRIEF DESCRIPTION

In one embodiment, a computer-implemented method for processing a transaction between a merchant and a consumer using a consumer mobile device wherein the consumer mobile device is in communication with a payment processing computing device having a memory and wherein the method includes receiving merchant data associated with the merchant at the payment processing computing device, receiving a consumer alias associated with payment credentials of the consumer at the payment processing computing device, receiving, by the payment processing computing device, a transaction request message from the consumer mobile device, the transaction request message including a merchant identifier, a transaction amount, a device identifier associated with the consumer mobile device, and consumer verification data, retrieving, from the memory, the account number based on the device identifier and the consumer verification data, retrieving, from the memory, the merchant and associated acquirer bank data based on the merchant identifier, generating, by the payment processing computing device, an authorization request message including the account number, the transaction amount, and the merchant data, transmitting the authorization request message over a payment network to an issuer bank.

In another embodiment, a computer-implemented method for processing a transaction between a consumer and a merchant using a consumer mobile device where the consumer mobile device is in communication with a payment processing computing device having a memory and wherein the method includes acquiring a price for a transaction between the consumer and the merchant using the consumer mobile device, acquiring merchant data associated with the merchant using the consumer mobile device, transmitting a device identifier associated with the consumer mobile device, the acquired price, and the merchant data in a transaction request message to the payment processing computing device, and receiving, by the consumer mobile device, a transaction authorization message from an issuer bank through a payment network, the transaction authorization message including an indication of approval or denial of the transaction request message.

In yet another embodiment, a mobile remote payment system for processing a transaction between a consumer and a merchant without using a point of sale (POS) device includes a payment processing computing device communicatively coupled to an electronic communications network, said payment processing computing device comprising a processor communicatively coupled to a memory device, a consumer mobile device comprising an image capture component and a geolocation component, said consumer mobile device communicatively couplable to the payment processing computing device through the electronic communications network, and a merchant consumer mobile device communicatively couplable to the payment processing computing device through the electronic communications network, where the payment processing computing device is programmed to receive merchant data associated with the merchant at the payment processing computing device, receive a consumer alias associated with the consumer at the payment processing computing device, receive, by the payment processing computing device, a transaction request message from the consumer mobile device, the transaction request message including a merchant identifier, a transaction amount, a device identifier associated with the consumer mobile device, and consumer verification data, retrieve, from the memory, the account number based on the device identifier and the consumer verification data, retrieve, from the memory, the merchant data based on the merchant identifier, generate, by the payment processing computing device, an authorization request message including the account number, the transaction amount, and the merchant and acquirer data, and transmit the authorization request message over a payment network to an issuer bank.

BRIEF DESCRIPTION OF THE DRAWINGS

FIGS. 1-6 show example embodiments of the methods and systems described herein.

DETAILED DESCRIPTION

Embodiments of the methods and systems described herein relate to permitting financial transactions using an interchange network in instances where the merchant may not have access to a POS device. Such a transaction may be consumer-initiated in that the consumer acquires data about the transaction with a portable mobile device, such as, a feature phone, smartphone, or tablet and then generates and transmits an authorization request to the interchange network.

The methods and systems described herein may be implemented using computer programming or engineering techniques including computer software, firmware, hardware or any combination or subset thereof, wherein the technical effect may include at least one of: (a) receiving merchant data associated with the merchant at the payment processing computing device, (b) receiving a consumer alias associated with payment credentials of the consumer at the payment processing computing device, (c) receiving, by the payment processing computing device, a transaction request message from the consumer mobile device, the transaction request message including a merchant identifier, a transaction amount, a device identifier associated with the consumer mobile device, and consumer verification data (d) retrieving, from the memory, the account number based on the device identifier and the consumer verification data, (e) retrieving, from the memory, the merchant data based on the merchant identifier, (f) generating, by the payment processing computing device, an authorization request message including the account number, the transaction amount, the merchant data, and information identifying an acquirer bank associated with the merchant, and (g) transmitting the authorization request message to the acquirer bank and over a payment network to an issuer bank.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, smartphones, personal digital assistants (PDAs), key fobs, and/or computers. Each type of transactions card can be used as a method of payment for performing a transaction.

In one embodiment, a computer program is provided, and the program is embodied on a computer readable medium. In an example embodiment, the system is executed on a single computer system, without requiring a connection to a sever computer. In a further example embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of AT&T located in New York, New York). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the disclosure by way of example and not by way of limitation. It is contemplated that the disclosure has general application to processing financial transaction data by a third party in industrial, commercial, and residential applications.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

Figure 1A:
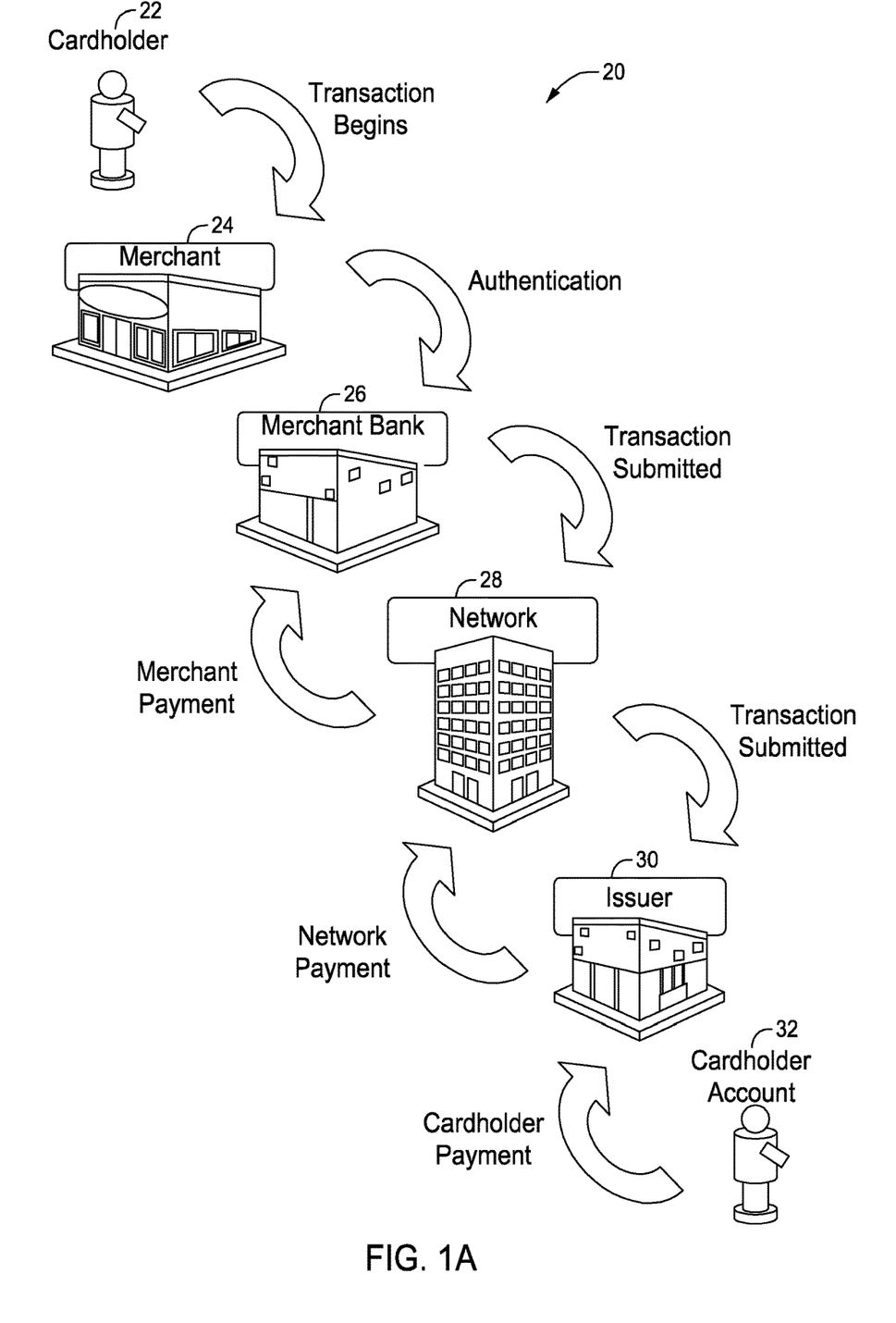
FIG. 1A is a schematic diagram illustrating an example multi-party transaction card industry system for enabling ordinary payment-by-card transactions in which merchants and card issuers do not need to have a one-to-one special relationship.

FIG. 1A is a schematic diagram illustrating an example multi-party transaction card industry system 20 for enabling ordinary payment-by-card transactions in which merchants 24 and card issuers 30 do not need to have a one-to-one special relationship. Embodiments described herein may relate to a transaction card system, such as a payment card network operated by MasterCard International Incorporated, the assignee of the present disclosure. The payment card network, as described herein, is a four-party payment card interchange network that includes a plurality of special purpose processors and data structures stored in one or more memory devices communicatively coupled to the processors, and a set of proprietary communications standards promulgated by MasterCard International Incorporated for the exchange of financial transaction data and the settlement of funds between financial institutions that are members of the payment network.

In a typical transaction card system, a financial institution called the "issuer" issues a transaction card, such as a credit card, to a consumer or cardholder 22, who uses the transaction card to tender payment for a purchase from a merchant 24. To accept payment with the transaction card, merchant 24 must normally establish an account with a financial institution that is part of the financial payment system. This financial institution is usually called the "merchant bank," the "acquiring bank," or the "acquirer." When cardholder 22 tenders payment for a purchase with a transaction card, merchant 24 requests authorization from a merchant bank 26 for the amount of the purchase. The request may be performed over the telephone, but is usually performed through the use of a point-of-sale terminal, which reads cardholder's 22 account information from a magnetic stripe, a chip, or embossed characters on the transaction card and communicates electronically with the transaction processing computers of merchant bank 26. Alternatively, merchant bank 26 may authorize a third party to perform transaction processing on its behalf. In this case, the point-of-sale terminal will be configured to communicate with the third party. Such a third party is usually called a "merchant processor," an "acquiring processor," or a "third party processor."

Using an interchange network 28, computers of merchant bank 26 or merchant processor will communicate with computers of an issuer bank 30 to determine whether cardholder's 22 account 32 is in good standing and whether the purchase is covered by cardholder's 22 available credit line. Based on these determinations, the request for authorization will be declined or accepted. If the request is accepted, an authorization code is issued to merchant 24.

When a request for authorization is accepted, the available credit line of cardholder's 22 account 32 is decreased. Normally, a charge for a payment card transaction is not posted immediately to cardholder's 22 account 32 because bankcard associations, such as the payment card network operated by MasterCard International Incorporated, have promulgated rules that do not allow merchant 24 to charge, or "capture," a transaction until goods are shipped or services are delivered. However, with respect to at least some debit card transactions, a charge may be posted at the time of the transaction. When merchant 24 ships or delivers the goods or services, merchant 24 captures the transaction by, for example, appropriate data entry procedures on the point-of-sale terminal. This may include bundling of approved transactions daily for standard retail purchases. If cardholder 22 cancels a transaction before it is captured, a "void" is generated. If cardholder 22 returns goods after the transaction has been captured, a "credit" is generated. Interchange network 28 and/or issuer bank 30 stores the transaction card information, such as a type of merchant, amount of purchase, date of purchase, in a database 120 (shown in FIG. 2).

After a purchase has been made, a clearing process occurs to transfer additional transaction data related to the purchase among the parties to the transaction, such as merchant bank 26, interchange network 28, and issuer bank 30. More specifically, during and/or after the clearing process, additional data, such as a time of purchase, a merchant name, a type of merchant, purchase information, cardholder account information, a type of transaction, itinerary information, information regarding the purchased item and/or service, and/or other suitable information, is associated with a transaction and transmitted between parties to the transaction as transaction data, and may be stored by any of the parties to the transaction. In the example embodiment, when cardholder 22 purchases travel, such as airfare, a hotel stay, and/or a rental car, at least partial itinerary information is transmitted during the clearance process as transaction data. When interchange network 28 receives the itinerary information, interchange network 28 routes the itinerary information to database 120.

After a transaction is authorized and cleared, the transaction is settled among merchant 24, merchant bank 26, and issuer bank 30. Settlement refers to the transfer of financial data or funds among merchant's 24 account, merchant bank 26, and issuer bank 30 related to the transaction. Usually, transactions are captured and accumulated into a "batch," which is settled as a group. More specifically, a transaction is typically settled between issuer bank 30 and interchange network 28, and then between interchange network 28 and merchant bank 26, and then between merchant bank 26 and merchant 24.

Figure 1B:
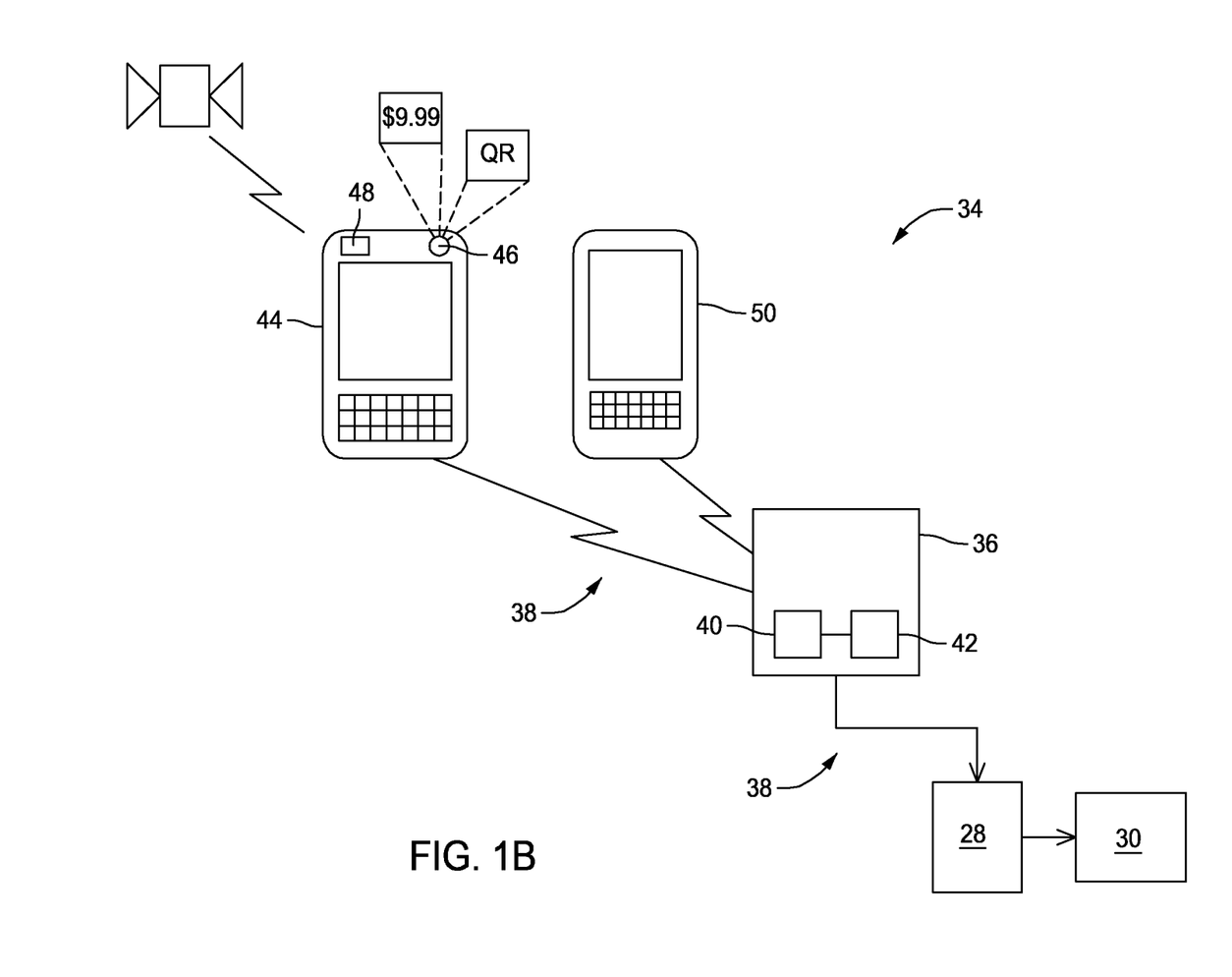
FIG. 1B is a schematic diagram illustrating another example multi-party payment card industry system using a mobile remote payment subsystem for enabling payment by mobile device transactions in which merchants and card issuers do not necessarily have a one-to-one relationship and merchants do not have a point-of-sale (POS) device.

FIG. 1B is a schematic diagram illustrating another example multi-party payment card industry system using a mobile remote payment subsystem 34 for enabling payment by mobile device transactions in which merchants and card issuers do not necessarily have a one-to-one relationship and merchants do not have a point-of-sale (POS) device.

In various regions of the world, merchants may not have POS devices in their shops or stalls. To facilitate financial transactions in these regions, an alternate system of charging a customers account, clearing the transaction, and crediting a merchant's account other messaging alternatives may be implemented.

In the example embodiment, mobile remote payment system 34 includes a payment processing computing device 36 communicatively coupled to an electronic communications network 38. Payment processing computing device 36 includes a processor 40 communicatively coupled to a memory device 42. Mobile remote payment system 34 also includes a consumer mobile device 44 that includes an image capture component 46 such as, but, not limited to a digital camera, and a geolocation component 48. Consumer mobile device 44 refers to a mobile computing device used by a cardholder for making a purchase, transmitting a personal record, storing a personal record, and/or displaying a personal record. Consumer mobile device 44 may be embodied in for example, but, not limited to a computer, smartphone, PDA, tablet, or any other device capable of performing the functions described herein. Consumer mobile device 44 may store payment card information and utilize the stored payment card information to perform payment transactions. Consumer mobile device 44 is communicatively couplable to payment processing computing device 36 through electronic communications network 38.

Mobile remote payment system 34 includes a merchant mobile device 50 communicatively couplable to payment processing computing device 36 through electronic communications network 38.

During a transaction, a consumer may wish to purchase a product from a merchant in a shop or stall that does not have a POS device. To initiate a financial transaction for the product, the consumer may scan a price of the product, either from a tag associated with the product or even a handwritten price. Alternatively, the price may be entered into a consumer mobile device 44 using a manual input using a user interface (UI) presented on the consumer mobile device or using speech input. The consumer then collects data about the merchant he wishes to do business with. In one embodiment, the consumer uses image capture component 46 to acquire an image of the merchant information such as, but, not limited to a business license or other business identifying information, or an optically recognizable code such as, but, not limited to a barcode or QR code that is able to provide the merchant's information that can be decoded by payment processing computing device 36. Moreover, the consumer may also use geolocation component 48 to determine a geographical location of the transaction which can be transmitted to payment processing computing device 36 for a determination of the merchant associated with that location. In other embodiments, both image capture component 46 and geolocation component 48 can be used together to more accurately determine the proper merchant for the transaction. When the information is acquired, the consumer indicates the information is accurate and consumer mobile device 44 transmits the information in an authorization request message to payment processing computing device 36 through network 38. Payment processing computing device 36 communicates with interchange 28 for further processing and/or forwarding to issuer 30. Payment processing computing device 36 then receives the authorization request response and forwards the response to both consumer mobile device 44 and merchant mobile device 50.

In various embodiments, payment processing computing device 36 is programmed to receive merchant data associated with the merchant, consumer alias, which can be used to obtain an account number associated with the consumer at the payment processing computing device, and a transaction request message from consumer mobile device 44, wherein the transaction request message includes a merchant identifier, a transaction amount, a device identifier associated with consumer mobile device 44, and consumer verification data. Rather than using an account number to identify the consumer a consumer alias may be used, such as, but not limited to, a phone number, email address or other identifier representative of the consumer. Payment processing computing device 36 is also programmed to retrieve, from memory 42, the consumer account number based on the device identifier, the consumer verification data and the merchant data based on the merchant identifier. In various embodiments, the device identifier and the consumer verification data are passed to interchange 28 where the account number, acquirer data, and merchant data are determined, rather than being determined by payment processing computing device 36.

Payment processing computing device 36 is further programmed to generate an authorization request message including the account number, the transaction amount, and the merchant data, transmit the authorization request message over a payment network to an issuer bank, receive an authorization response message from the issuer bank through the payment network, and transmit the authorization response message to consumer mobile device 44 and merchant mobile device 50.

Figure 2:
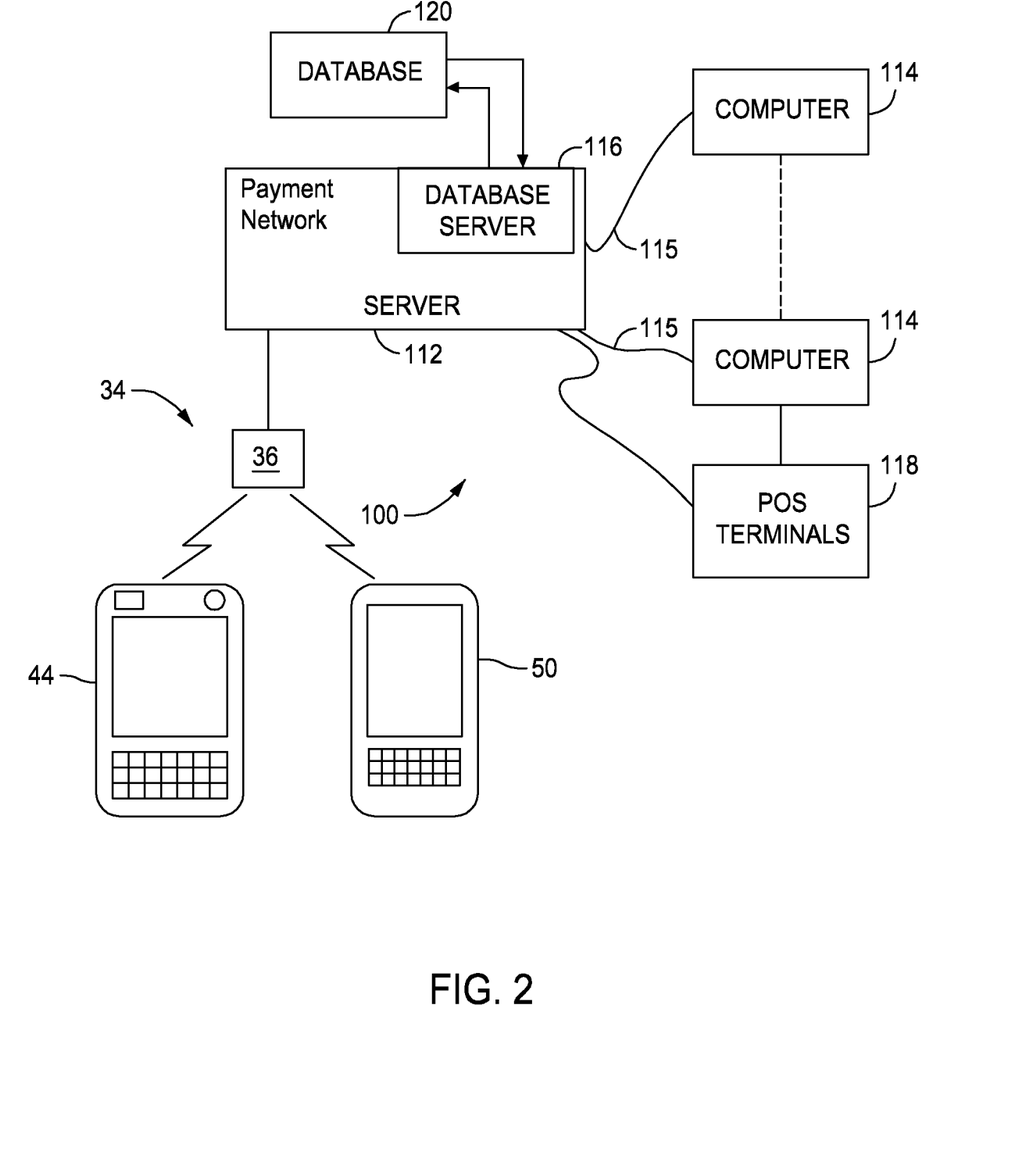
FIG. 2 is a simplified block diagram of an example processing system including a plurality of computer devices in accordance with one embodiment of the present disclosure.

FIG. 2 is a simplified block diagram of an example processing system 100 including a plurality of computer devices in accordance with one embodiment of the present disclosure. In the example embodiment, system 100 may be used for performing payment-by-card transactions and/or mobile remote payments as of part processing the financial transaction. For example, system 100 may receive financial transaction information from mobile remote payment system 34, such as, but, not limited to a price for a product or service, merchant information, and identifying information for consumer mobile device 44. Some of the information may be passed on to interchange network 28 for processing or some of the information may be processed locally at payment processing computing device 36 and the resultant processed data may then be transmitted to interchange network 28. For example, an image of the price may be acquired by consumer mobile device 44 and the image file may be processed using optical character recognition (OCR) onboard consumer mobile device 44 to generate a text or other format file containing the price information. Alternatively, the image file may be transmitted to payment processing computing device 36, where payment processing computing device 36 would process the image file to extract the price information. In another embodiment, the image file could be transmitted to interchange network 28, where the price information could be extracted. The processing may be selectable based on the computing power of the respective devices and/or a bandwidth of the communications links between the components.

More specifically, in the example embodiment, system 100 includes a server system 112, and a plurality of client sub-systems, also referred to as client systems 114, connected to server system 112. In one embodiment, client systems 114 are computers including a web browser, such that server system 112 is accessible to client systems 114 using the Internet. Client systems 114 are interconnected to the Internet through many interfaces including a network, such as a local area network (LAN) or a wide area network (WAN), dial-in-connections, cable modems, and special high-speed Integrated Services Digital Network (ISDN) lines. Client systems 114 could be any device capable of interconnecting to the Internet including a web-based phone, PDA, or other web-based connectable equipment.

System 100 also includes point-of-sale (POS) terminals 118, which may be connected to client systems 114 and may be connected to server system 112. POS terminals 118 are interconnected to the Internet through many interfaces including a network, such as a local area network (LAN) or a wide area network (WAN), dial-in-connections, cable modems, wireless modems, and special high-speed ISDN lines. POS terminals 118 could be any device capable of interconnecting to the Internet and including an input device capable of reading information from a consumer's financial transaction card.

A database server 116 is connected to database 120, which contains information on a variety of matters, as described below in greater detail. In one embodiment, centralized database 120 is stored on server system 112 and can be accessed by potential users at one of client systems 114 by logging onto server system 112 through one of client systems 114. In an alternative embodiment, database 120 is stored remotely from server system 112 and may be non-centralized.

Database 120 may include a single database having separated sections or partitions or may include multiple databases, each being separate from each other. Database 120 may store transaction data generated as part of sales activities conducted over the processing network including data relating to merchants, account holders or customers, issuers, acquirers, purchases made. Database 120 may also store account data including at least one of a cardholder name, a cardholder address, an account number, and other account identifier. Database 120 may also store merchant data including a merchant identifier that identifies each merchant registered to use the network, and instructions for settling transactions including merchant bank account information. Database 120 may also store purchase data associated with items being purchased by a cardholder from a merchant, and authorization request data. Database 120 may store merchant and associated acquirer data, an account number and alias associated with the consumer, a merchant identifier, a transaction amount, a device identifier associated with the consumer mobile device, and/or consumer verification data for processing according to the method described in the present disclosure.

In the example embodiment, one of client systems 114 may be associated with acquirer bank 26 (shown in FIG. 1) while another one of client systems 114 may be associated with issuer bank 30 (shown in FIG. 1). POS terminal 118 may be associated with a participating merchant 24 (shown in FIG. 1) or may be a computer system and/or mobile system used by a cardholder making an on-line purchase or payment. Server system 112 may be associated with interchange network 28. In the example embodiment, server system 112 is associated with a network interchange, such as interchange network 28, and may be referred to as an interchange computer system. Server system 112 may be used for processing transaction data. In addition, client systems 114 and/or POS 118 may include a computer system associated with at least one of an online bank, a bill payment outsourcer, an acquirer bank, an acquirer processor, an issuer bank associated with a transaction card, an issuer processor, a remote payment system, a biller, and/or mobile remote payment system 34. Mobile remote payment system 34 may be associated with interchange network 28 or with an outside third party in a contractual relationship with interchange network 28. Accordingly, each party involved in processing transaction data are associated with a computer system shown in system 100 such that the parties can communicate with one another as described herein.

Using the interchange network, the computers of the merchant bank or the merchant processor will communicate with the computers of the issuer bank to determine whether the consumer's account is in good standing and whether the purchase is covered by the consumer's available credit line. Based on these determinations, the request for authorization will be declined or accepted. If the request is accepted, an authorization code is issued to the merchant.

When a request for authorization is accepted, the available credit line of consumer's account is decreased. Normally, a charge is not posted immediately to a consumer's account because bankcard associations, such as the payment card network, have promulgated rules that do not allow a merchant to charge, or "capture," a transaction until goods are shipped or services are delivered. When a merchant ships or delivers the goods or services, the merchant captures the transaction by, for example, appropriate data entry procedures on the point-of-sale terminal. If a consumer cancels a transaction before it is captured, a "void" is generated. If a consumer returns goods after the transaction has been captured, a "credit" is generated.

For debit card transactions, when a request for a PIN authorization is approved by the issuer, the consumer's account is decreased. Normally, a charge is posted immediately to a consumer's account. The bankcard association then transmits the approval to the acquiring processor for distribution of goods/services, or information or cash in the case of an ATM.

After a transaction is captured, the transaction is settled between the merchant, the merchant bank, and the issuer. Settlement refers to the transfer of financial data or funds between the merchant's account, the merchant bank, and the issuer related to the transaction. Usually, transactions are captured and accumulated into a "batch," which is settled as a group.

The financial transaction cards or payment cards discussed herein may include credit cards, debit cards, a charge card, a membership card, a promotional card, prepaid cards, and gift cards. These cards can all be used as a method of payment for performing a transaction. As described herein, the term "financial transaction card" or "payment card" includes cards such as credit cards, debit cards, and prepaid cards, but also includes any other devices that may hold payment account information, such as mobile phones, personal digital assistants (PDAs), key fobs, or other devices, etc.

Figure 3:
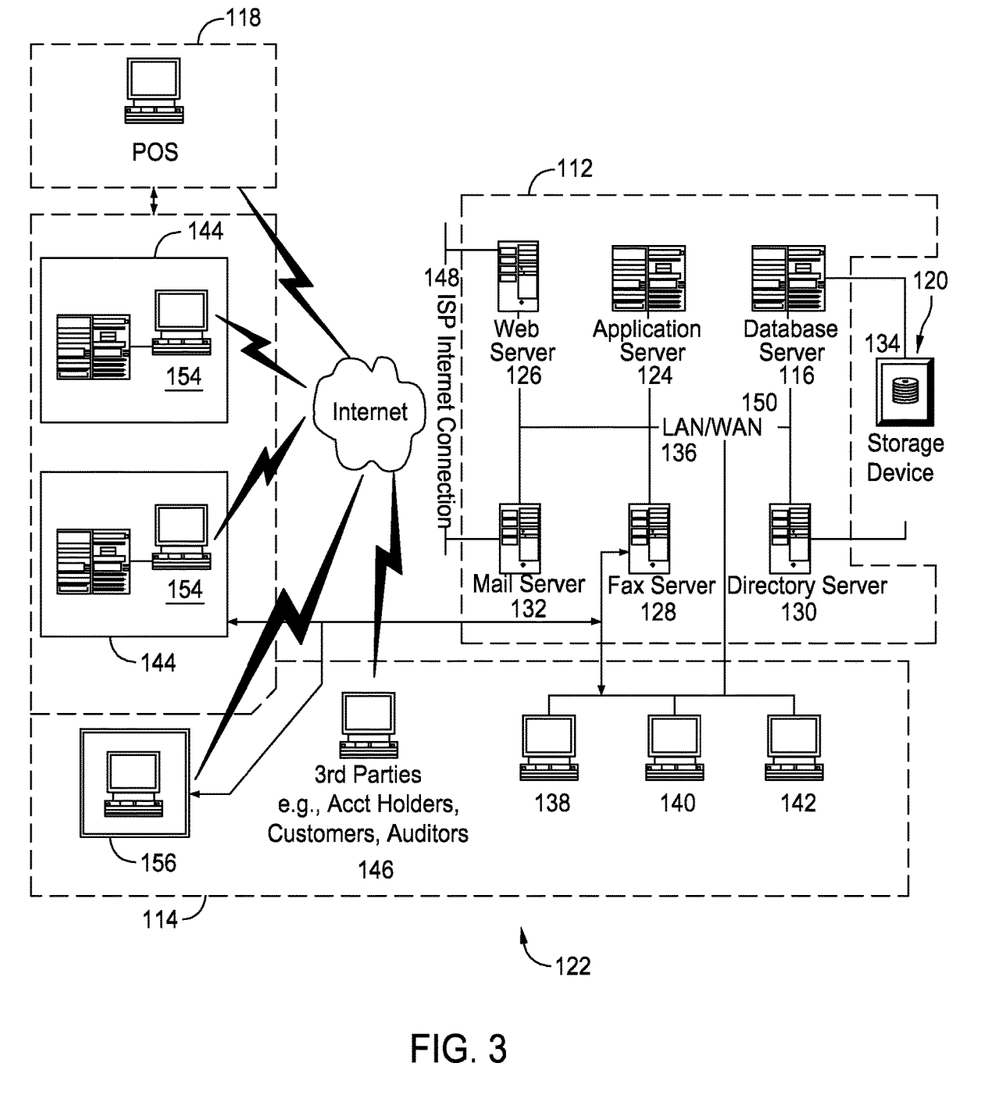
FIG. 3 is an expanded block diagram of an example embodiment of a server architecture of a processing system including other computer devices in accordance with one embodiment of the present disclosure.

FIG. 3 is an expanded block diagram of an example embodiment of a server architecture of a processing system 122 including other computer devices in accordance with one embodiment of the present disclosure. Components in system 122, identical to components of system 100 (shown in FIG. 2), are identified in FIG. 3 using the same reference numerals as used in FIG. 2. System 122 includes server system 112, client systems 114, and POS terminals 118. Server system 112 further includes database server 116, a transaction server 124, a web server 126, a fax server 128, a directory server 130, and a mail server 132. A storage device 134 is coupled to database server 116 and directory server 130. Servers 116, 124, 126, 128, 130, and 132 are coupled in a local area network (LAN) 136. In addition, a system administrator's workstation 138, a user workstation 140, and a supervisor's workstation 142 are coupled to LAN 136. Alternatively, workstations 138, 140, and 142 are coupled to LAN 136 using an Internet link or are connected through an Intranet.

Each workstation, 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 144 and to third parties, e.g., account holders, customers, auditors, developers, consumers, merchants, acquirers, issuers, etc., 146 using an ISP Internet connection 148. The communication in the example embodiment is illustrated as being performed using the Internet, however, any other wide area network (WAN) type communication can be utilized in other embodiments, i.e., the systems and processes are not limited to being practiced using the Internet. In addition, and rather than WAN 150, local area network 136 could be used in place of WAN 150.

In the example embodiment, any authorized individual having a workstation 154 can access system 122. At least one of the client systems includes a manager workstation 156 located at a remote location. Workstations 154 and 156 are personal computers having a web browser. Also, workstations 154 and 156 are configured to communicate with server system 112. Furthermore, fax server 128 communicates with remotely located client systems, including a client system 156 using a telephone link. Fax server 128 is configured to communicate with other client systems 138, 140, and 142 as well.

Figure 4:
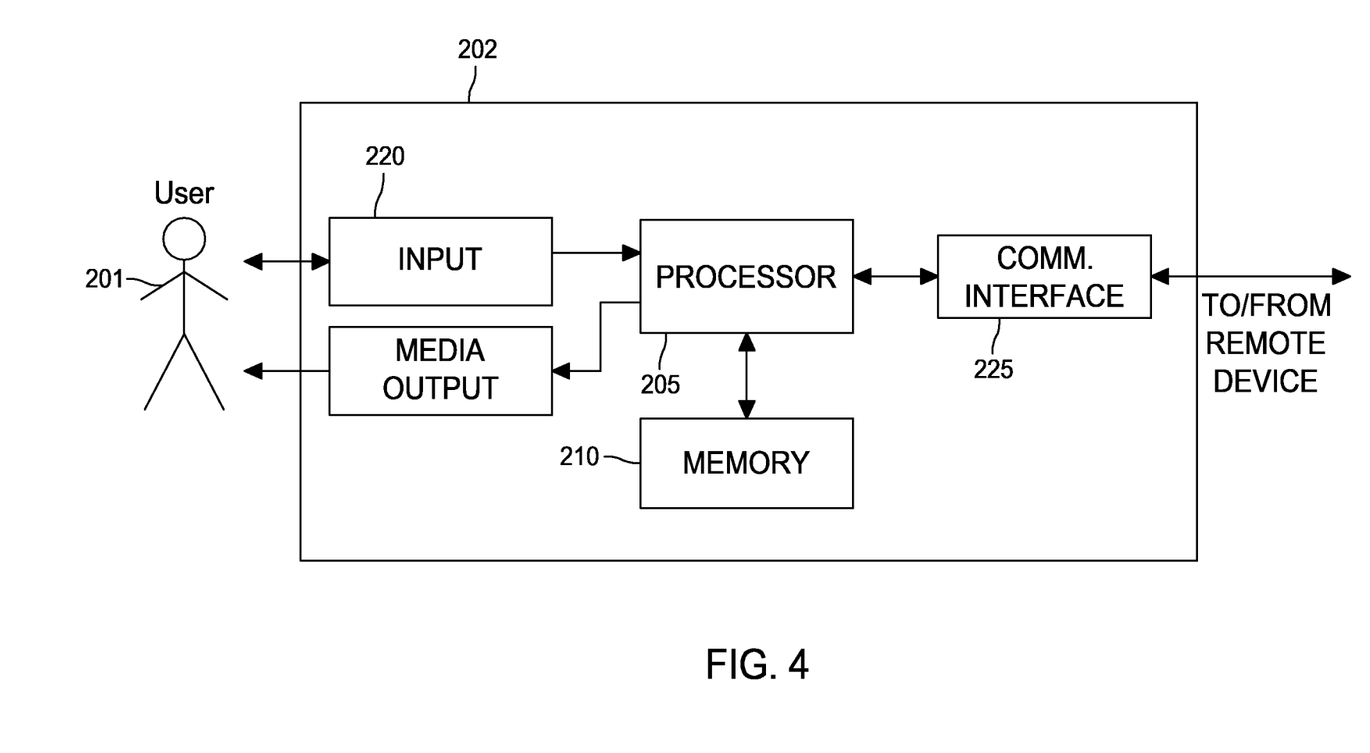
FIG. 4 illustrates an example configuration of a user system operated by a user, such as the cardholder shown in FIG. 1.

FIG. 4 illustrates an example configuration of a user system 202 operated by a user 201, such as cardholder 22 (shown in FIG. 1). User system 202 may include, but is not limited to, client systems 114, 138, 140, and 142, POS terminal 118, workstation 154, and manager workstation 156. In the example embodiment, user system 202 includes a processor 205 for executing instructions. In some embodiments, executable instructions are stored in a memory area 210. Processor 205 may include one or more processing units, for example, a multi-core configuration. Memory area 210 is any device allowing information such as executable instructions and/or written works to be stored and retrieved. Memory area 210 may include one or more computer readable media.

User system 202 also includes at least one media output component 215 for presenting information to user 201. Media output component 215 is any component capable of conveying information to user 201. In some embodiments, media output component 215 includes an output adapter such as a video adapter and/or an audio adapter. An output adapter is operatively coupled to processor 205 and operatively couplable to an output device such as a display device, a liquid crystal display (LCD), organic light emitting diode (OLED) display, or "electronic ink" display, or an audio output device, a speaker or headphones.

In some embodiments, user system 202 includes an input device 220 for receiving input from user 201. Input device 220 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 215 and input device 220. User system 202 may also include a communication interface 225, which is communicatively couplable to a remote device such as server system 112. Communication interface 225 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Stored in memory area 210 are, for example, computer readable instructions for providing a user interface to user 201 via media output component 215 and, optionally, receiving and processing input from input device 220. A user interface may include, among other possibilities, a web browser and client application. Web browsers enable users, such as user 201, to display and interact with media and other information typically embedded on a web page or a website from server system 112. A client application allows user 201 to interact with a server application from server system 112.

Figure 5:
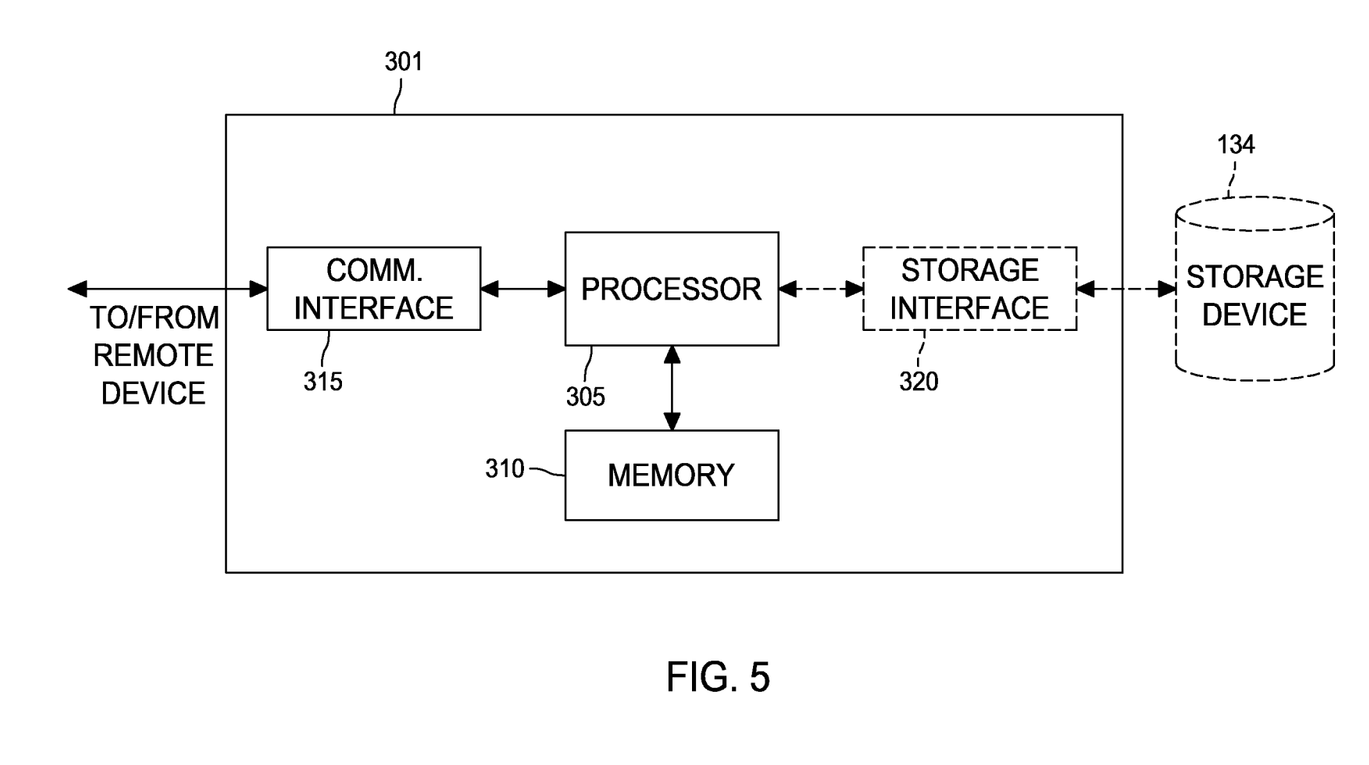
FIG. 5 illustrates an example configuration of a server system such as server system shown in FIGS. 2 and 3.

FIG. 5 illustrates an example configuration of a server system 301 such as server system 112 (shown in FIGS. 2 and 3). Server system 301 may include, but is not limited to, database server 116, transaction server 124, web server 126, fax server 128, directory server 130, and mail server 132.

Server system 301 includes a processor 305 for executing instructions. Instructions may be stored in a memory area 310, for example. Processor 305 may include one or more processing units (e.g., in a multi-core configuration) for executing instructions. The instructions may be executed within a variety of different operating systems on the server system 301, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 305 is operatively coupled to a communication interface 315 such that server system 301 is capable of communicating with a remote device such as a user system or another server system 301. For example, communication interface 315 may receive requests from client system 114 via the Internet, as illustrated in FIGS. 2 and 3.

Processor 305 may also be operatively coupled to a storage device 134. Storage device 134 is any computer-operated hardware suitable for storing and/or retrieving data. In some embodiments, storage device 134 is integrated in server system 301. For example, server system 301 may include one or more hard disk drives as storage device 134. In other embodiments, storage device 134 is external to server system 301 and may be accessed by a plurality of server systems 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Figure 6:
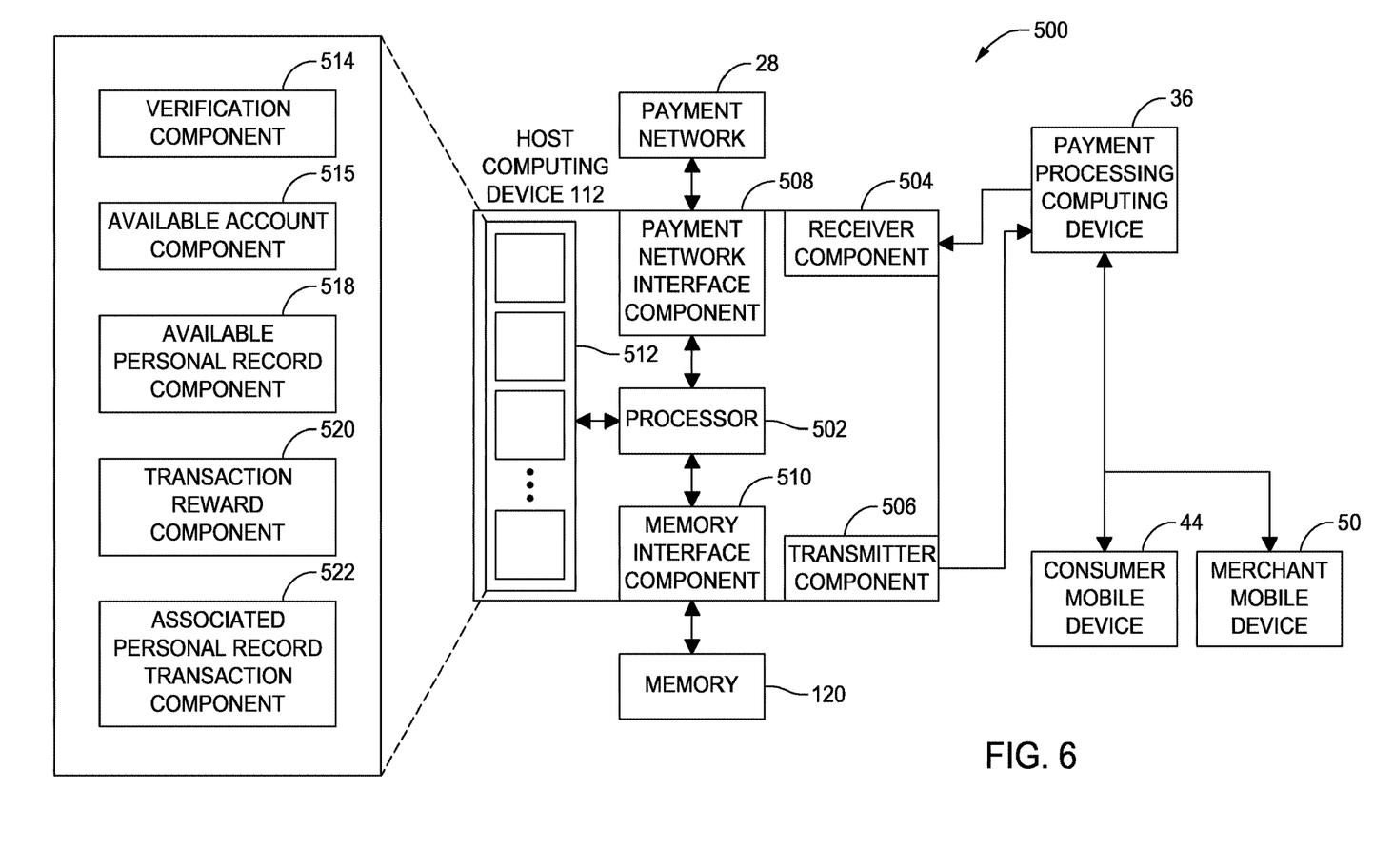
FIG. 6 illustrates a component view of the mobile remote payment system illustrated in FIG. 2.

FIG. 6 illustrates a component view 500 of the payment and record system 100 as illustrated in FIG. 2. In the example embodiment, Server system 112 includes a plurality of components for performing the functions described herein. More specifically, server system 112 comprises a processor 502, a receiver component 504, a transmitter component 506, a payment network interface component 508, a memory interface component 510, a verification component 514, an available account component 516, an available personal record component 518, a transaction reward component 520, and an associated personal record transaction component 522.

Processor 502 may be any device capable of executing computer-executable instructions. Processor 502 may be configured to process and direct data from one component to another component. In the example embodiment, processor 502 may be the Central Processing Unit (CPU) of server system 112.

Receiver component 504 may be any device capable of receiving a signal. In the example embodiment, receiver component 504 includes a network adapter for receiving data through a network connection such as a WAN or LAN. Receiver component 504 is communicatively coupled to at least one of client system 114, payment processing computing device 36, and processor 502. Receiver component 504 is configured to receive data from payment processing computing device 36 and route the data to processor 502.

Transmitter component 506 may be any device capable of transmitting a signal. In the example embodiment, transmitter component 506 is a network adapter capable of transmitting data through a network connection such as a WAN or LAN. Transmitter component 506 is communicatively coupled to processor 502 and payment processing computing device 36, and is configured to transmit signals from processor 502 to payment processing computing device 36.

Payment network interface component 508 may be any device or set of computer-executable instructions that enables server system 112 to communicate with interchange network 28. In the example embodiment, payment network interface component 508 is a network adapter and sends and receives data through a network connection such as a WAN or LAN.

Memory interface component 510 may be any device or set of computer-executable instructions for communicating with memory 120. In the example embodiment, memory interface 510 communicates with memory 120 to store and retrieve data.

Verification component 514 may be a device or set of computer-executable instructions for verifying the identity of at least one of cardholder 22 and merchant 24. Verification component 514 may use, for example, a personal identification number (PIN) entered by cardholder 22 or merchant 24. Additionally, a challenge question using transaction data associated with cardholder 22 may be presented to cardholder 22 and cardholder 22 be prompted for an answer. Because the challenge question or questions are based on cardholder 22 own transaction data, the probability that only cardholder 22 would be able to answer the challenge question(s) is relatively high.

Available account component 516 may be a device or set of computer-executable instructions for determining payment accounts associated with cardholder 22 that are available for making a payment transaction. The available account component 516 may also provide a list of available accounts to cardholder computing device 121.

Available personal record component 518 may be any device or set of computer-executable instructions for determining personal records that are available to be stored or are available to be transferred. The personal records available to be transferred may be stored in memory 120. The personal records to be stored may be located on client system 114 or cardholder computing device 121.

Transaction reward component 520 may be a device or set of computer-executable instructions for determining whether any discounts, coupons, rewards points, product reviews, or other incentives, are associated with a particular payment transaction.

Associated personal record transaction component 522 may be any device or set of computer-executable instructions for determining whether an additional personal record transaction associated with at least one of a completed payment transaction and a completed personal record transaction is available.

As used herein, the terms "software" and "firmware" are interchangeable, and include any computer program stored in memory for execution by processors 40, 205, and/or 305. Memory area 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are examples only, and are thus not limiting as to the types of memory usable for storage of a computer program.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As will be appreciated based on the foregoing specification, the above-discussed embodiments of the disclosure may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture, according to the discussed embodiments of the disclosure. The computer readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network.

The above-described embodiments of a method and system of a mobile remote payment system provides a cost-effective and reliable means for receiving a consumer initiated financial payment request during a financial transaction with a merchant that may not have a POS device. More specifically, the methods and systems described herein facilitate acquiring the data needed by a consumer to submit a payment authorization request message to an interchange network. In addition, the above-described methods and systems facilitate transmitting a payment authorization request message to an issuer bank for authorization As a result, the methods and systems described herein facilitate expanding consumers' ability to engage in commerce in a cost-effective and reliable manner.

This written description uses examples to disclose the disclosure, including the best mode, and also to enable any person skilled in the art to practice the disclosure, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A payment processing computing device for processing a transaction between a consumer and a merchant, the payment processing computing device comprising a processor communicatively coupled to a consumer mobile device via an electronic communications network and communicatively coupled to a memory device, wherein the processor is programmed to:
   prior to generating an authorization request message, transmit, to the consumer mobile device, a challenge question associated with one or more previous transactions initiated by the consumer;
   prior to generating the authorization request message, receive, from the consumer mobile device and without use of one or more computing devices associated with the merchant, a consumer alias, transaction amount data, consumer verification data, and merchant data associated with the merchant, the transaction amount data comprising an image file of one or more amounts for one or more items in the transaction captured by an image capture component of the consumer mobile device and without the use of the one or more computing devices associated with the merchant, the consumer verification data comprising an answer to the challenge question, the merchant data comprising an image of optical merchant identification information captured by the image capture component and without the use of the one or more computing devices associated with the merchant, and a geolocation of the merchant captured by a geolocation component of the consumer mobile device, wherein the image includes unencoded business-identifying information of the merchant;
   prior to generating the authorization request message, determine, based on at least one of a computing power of the processor or a bandwidth of the electronic communications network, to process the received image file by the processor or transmit the received image file to an interchange network for processing, wherein the interchange network is communicatively coupled to the processor via the electronic communications network;
   prior to generating the authorization request message and in response to determining to process the received image file by the processor, determine a merchant identifier of the merchant based on the received image and the received geolocation, and a transaction amount based on processing the image file included in the transaction amount data;

verify, using merchant verification data previously received from registered merchants, that the determined merchant identifier and the merchant are associated with a registered merchant of the registered merchants;

retrieve, from the memory device, information identifying an acquiring bank associated with the determined merchant identifier, wherein the registered merchant has an established account with the acquiring bank;

retrieve, from the memory device, an account number based on the consumer alias and the consumer verification data, the account number associated with the consumer;

generate, without receiving any information from the one or more computing devices associated with the registered merchant, the authorization request message including the account number, the determined transaction amount, and the determined merchant identifier;

transmit the authorization request message over a payment network to an issuer bank associated with the consumer, wherein the registered merchant has no relationship with the issuer bank;

transmit the authorization request message to the acquirer bank associated with the registered merchant; and settle the transaction between the issuer bank and the registered merchant via the acquirer bank.

2. The payment processing computing device of claim 1, wherein the payment processing computing device is further communicatively coupled to the one or more computing devices associated with the merchant and the processor is further programmed to:

receive an authorization response message from the issuer bank through the payment network; and transmit the authorization response message to the consumer mobile device and the one or more computing devices associated with the merchant, wherein the one or more computing devices associated with the merchant is one of a feature phone, a smartphone, and a tablet.

3. The payment processing computing device of claim 2, wherein the consumer mobile device and the one or more computing devices associated with the merchant are wireless devices communicatively couplable to the payment processing computing device through a wireless portion of the electronic communications network.

4. The payment processing computing device of claim 1, wherein the consumer verification data includes a personal identification number (PIN) of the consumer, and the merchant verification data includes a personal identification number (PIN) of the registered merchant.

5. The payment processing computing device of claim 1, wherein the processor is further programmed to generate the challenge question using transaction data associated with the consumer.

6. The payment processing computing device of claim 1, wherein the consumer alias includes one of a phone number and an email address of the consumer.

7. The payment processing computing device of claim 1, wherein the consumer alias includes a device identifier associated with the consumer mobile device.

8. A computer-implemented method for processing a transaction between a merchant and a consumer, the method implemented using a payment processing computing device including a processor communicatively coupled to a consumer mobile device via an electronic communications network and communicatively coupled to a memory device, the method comprising steps performed by the processor of:

prior to generating an authorization request message, transmitting, to the consumer mobile device, a challenge question associated with one or more previous transactions initiated by the consumer;

prior to generating the authorization request message, receiving, from the consumer mobile device and without use of one or more computing devices associated with the merchant, a consumer alias, transaction amount data, consumer verification data, and merchant data associated with the merchant, the transaction amount data including an image file of one or more amounts for one or more items in the transaction captured by an image capture component of the consumer mobile device and without the use of the one or more computing devices associated with the merchant, the consumer verification data including an answer to the challenge question, the merchant data including an image of optical merchant identification information captured by the image capture component and without the use of the one or more computing devices associated with the merchant, and a geolocation of the merchant captured by a geolocation component of the consumer mobile device, wherein the image includes unencoded business-identifying information of the merchant;

prior to generating the authorization request message, determine, based on at least one of a computing power of the processor or a bandwidth of the electronic communications network, to process the received image file by the processor or transmit the received image file to an interchange network for processing, wherein the interchange network is communicatively coupled to the processor via the electronic communications network;

prior to generating the authorization request message and in response to determining to process the received image file by the processor, determining a merchant identifier of the merchant based on the received image and the received geolocation, and a transaction amount based on processing the image file included in the transaction amount data;

verifying, using merchant verification data previously received from registered merchants, that the determined merchant identifier and the merchant are associated with a registered merchant of the registered merchants;

retrieving, from the memory device, information identifying an acquiring bank associated with the determined merchant identifier, wherein the registered merchant has an established account with the acquiring bank;

retrieving, from the memory device, an account number based on the consumer alias and the consumer verification data, the account number associated with the consumer;

generating, without receiving any information from the one or more computing devices associated with the registered merchant, the authorization request message including the account number, the determined transaction amount, and the determined merchant identifier;

transmitting the authorization request message over a payment network to an issuer bank associated with the consumer, wherein the registered merchant has no relationship with the issuer bank;

transmitting the authorization request message to the acquirer bank associated with the registered merchant; and settling the transaction between the issuer bank and the registered merchant via the acquirer bank.

9. The method of claim 8, wherein the payment processing computing device is further communicatively coupled to the one or more computing devices associated with the merchant, and wherein the method further comprises:
receiving an authorization response message from the issuer bank through the payment network; and
transmitting the authorization response message to the consumer mobile device and the one or more computing devices associated with the merchant, wherein the one or more merchant devices is one of a feature phone, a smartphone, and a tablet.

10. The method of claim 9, wherein the consumer mobile device and the one or more computing devices associated with the merchant are wireless devices communicatively couplable to the payment processing computing device through a wireless portion of the electronic communications network.

11. The method of claim 8, wherein the consumer verification data includes a personal identification number (PIN) of the consumer, and the merchant verification data includes a personal identification number (PIN) of the registered merchant.

12. The method of claim 8 further comprising generating the challenge question using transaction data associated with the consumer.

13. The method of claim 8, wherein the consumer alias includes one of a phone number and an email address of the consumer.

14. The method of claim 8, wherein the consumer alias includes a device identifier associated with the consumer mobile device.

15. At least one non-transitory computer-readable storage medium having computer-executable instructions embodied thereon, wherein when executed by a payment processing computing device for processing a transaction between a consumer and a merchant, the payment processing computing device including a processor communicatively coupled to a consumer mobile device via an electronic communications network and communicatively coupled to a memory device, the computer-executable instructions cause the processor to:
prior to generating an authorization request message, transmit, to the consumer mobile device, a challenge question associated with one or more previous transactions initiated by the consumer;
prior to generating the authorization request message, receive, from the consumer mobile device and without use of one or more computing devices associated with the merchant, a consumer alias, transaction amount data, consumer verification data, and merchant data associated with the merchant, the transaction amount data including an image file of one or more amounts for one or more items in the transaction captured by an image capture component of the consumer mobile device and without the use of the one or more computing devices associated with the merchant, the consumer verification data including an answer to the challenge question, the merchant data including an image of optical merchant identification information captured by the image capture component and without the use of the one or more computing devices associated with the merchant and a geolocation of the merchant captured by a geolocation component of the consumer mobile device, wherein the image includes unencoded business-identifying information of the merchant;
prior to generating the authorization request message, determine, based on at least one of a computing power of the processor or a bandwidth of the electronic communications network, to process the received image file by the processor or transmit the received image file to an interchange network for processing, wherein the interchange network is communicatively coupled to the processor via the electronic communications network;
prior to generating the authorization request message and in response to determining to process the received image file by the processor, determine a merchant identifier of the merchant based on the received image and the received geolocation, and a transaction amount based on processing the image file included in the transaction amount data;
verify, using merchant verification data previously received from registered merchants, that the determined merchant identifier and the merchant are associated with a registered merchant of the registered merchants;
retrieve, from the memory device, information identifying an acquiring bank associated with the determined merchant identifier, wherein the registered merchant has an established account with the acquiring bank;
retrieve, from the memory device, an account number based on the consumer alias and the consumer verification data, the account number associated with a consumer;
generate, without receiving any information from the one or more computing devices associated with the registered merchant, the authorization request message including the account number, the determined transaction amount, and the determined merchant identifier;
transmit the authorization request message over a payment network to an issuer bank associated with the consumer, wherein the registered merchant has no relationship with the issuer bank;
transmit the authorization request message to the acquirer bank associated with the registered merchant; and
settle the transaction between the issuer bank and the registered merchant via the acquirer bank.

16. The computer-readable storage medium of claim 15, wherein the payment processing computing device is further communicatively coupled to the one or more computing devices associated with the merchant, and wherein the computer-executable instructions further cause the processor to:
receive an authorization response message from the issuer bank through the payment network; and
transmit the authorization response message to the consumer mobile device and the one or more computing devices associated with the merchant, wherein the one or more computing devices associated with the merchant is one of a feature phone, a smartphone, and a tablet.

17. The computer-readable storage medium of claim 15, wherein the consumer verification data includes a personal identification number (PIN) of the consumer, and the merchant verification data includes a personal identification number (PIN) of the registered merchant.

18. The computer-readable storage medium of claim 15, wherein the computer-executable instructions further cause the processor to generate the challenge question using transaction data associated with the consumer.

19. The computer-readable storage medium of claim 15, wherein the consumer alias includes one of a phone number and an email address of the consumer.

20. The computer-readable storage medium of claim 15, wherein the consumer alias includes a device identifier associated with the consumer mobile device.

* * * * *